G. F. HAMMOND.
CAMERA FINDER.
APPLICATION FILED AUG. 4, 1909.
970,443.
Patented Sept. 13, 1910.
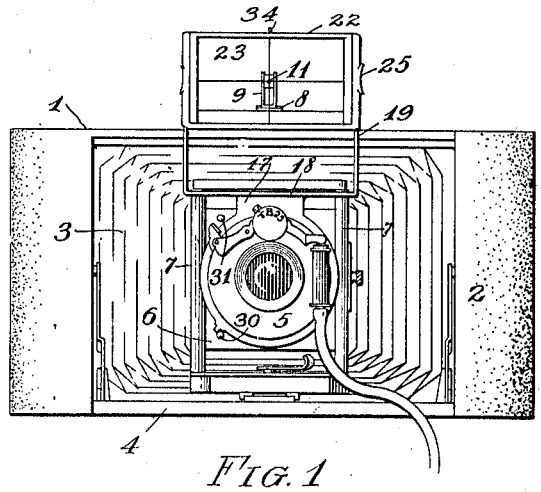
Fig. 1
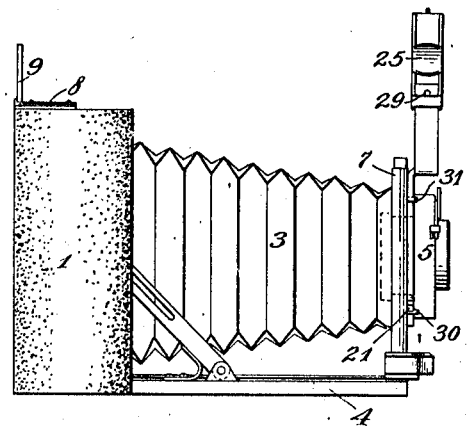
Fig. 2
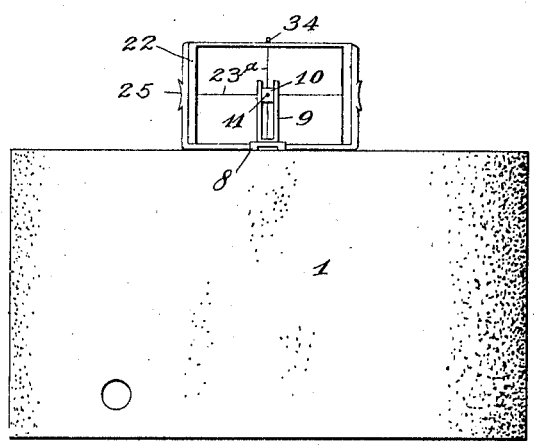
Fig. 3
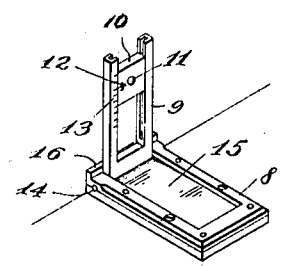
Fig. 4
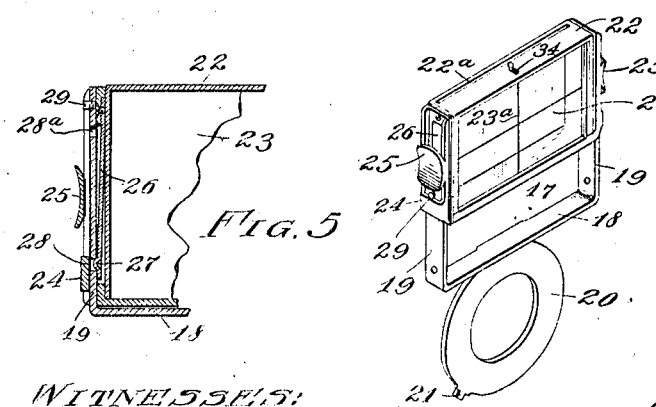
Fig. 5
Fig. 6
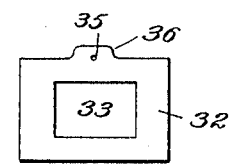
Fig. 7
WITNESSES:
Brennan B. West
Chas. C. Watt
INVENTOR,
Geo. F. Hammond
BY Bates, Fouts & Hull
ATTYS.

UNITED STATES PATENT OFFICE.

GEORGE F. HAMMOND, OF CLEVELAND, OHIO.

CAMERA-FINDER.

970,443.  Specification of Letters Patent.  Patented Sept. 13, 1910.

Application filed August 4, 1909. Serial No. 511,190.

*To all whom it may concern:*

Be it known that I, GEORGE F. HAMMOND, a citizen of the United States, residing at Cleveland, in the county of Cuyahoga and State of Ohio, have invented a certain new and useful Improvement in Camera-Finders, of which the following is a full, clear, and exact description, reference being had to the accompanying drawings.

This invention relates to cameras, and more especially to finders therefor.

The objects of the invention are to provide a camera of the ordinary hand or folding type with a finder of large area which will at all times present to the eye of the operator a field co-extensive with the field projected by the lens upon the sensitized plate or film; also to provide a finder which, while securing the above results, can be carried as a part of the camera and will not interfere with the ordinary operations of the same, especially the folding of the lens and bellows into the camera box.

A further object of the invention is to provide, with such a finder, a coöperating adjustable sight which will secure a proper relation between the field observed through the finder and that projected upon the sensitized film or plate irrespective of the distances of the objects photographed from the camera.

A further object of the invention is to provide a finder with means whereby it may be conveniently adapted for representing correctly the field projected upon the sensitized plate or film when the field covered by the lens is narrowed, as when using the camera with a tele-photo attachment or with the front combination of the lens removed.

With the above objects in view, the invention may be further defined as consisting of the combinations of elements embodied in the claims hereto annexed and illustrated in the drawings forming part hereof, wherein—

Figure 1 represents a front elevation of a camera having my finder applied thereto; Fig. 2 a side elevation; and Fig. 3 a rear elevation of the parts shown in Fig. 1; Fig. 4 a perspective view of the sight which I employ in combination with the finder; Fig. 5 a detail in section; and Fig. 6 a detail in perspective of the finder proper; and Fig. 7 an elevation of the attachment for varying the field of the finder.

Describing the parts by reference characters, 1 denotes the casing or box of a camera of the ordinary "pocket" or folding type, the camera being adapted to coöperate with a film or plate which is of greater length on one of its sides than on the other and having a front opening, one side of which is of greater length than the adjacent side, and the box being shown as provided with an inwardly projecting front 2.

3 denotes the bellows, 4 the hinged front of the box on which the lens is supported when the bellows are distended.

5 denotes the lens frame, which is of the usual cylindrical type and is carried by the front 6, said sliding front being of any ordinary or standard construction and adapted to be raised and lowered on the posts 7.

The camera will be provided with a shutter of any approved type.

The parts hereinbefore described are of any standard or approved construction and, in their details, form no part of my invention.

On the upper long side of the camera box there is mounted a sight which coöperates with my finder. This sight is shown in detail in Fig. 4 and comprises a base 8 which is applied to the camera box with a frame pivoted at one end of said base, said frame comprising a pair of parallel members 9 having a block 10 slidably mounted with respect to the members 9, said block having a sight opening 11 therein. The block 10 may be provided with an index 12 coöperating with a scale 13 on one of the members carrying the block. The members 9 are pivoted at their lower ends to the frame 8, as shown at 14, and may be folded down into said frame, being held in their elevated position by means of a spring 15 on one side thereof and a stop 16 on the other side. It will be observed, from Fig. 2, that the members 9, when folded upwardly, are in substantially the same plane as the sensitized film or plate which will be used in the camera.

17 denotes a frame, said frame comprising a base 18, arms 19 projecting from opposite ends of said base and a ring 20, said ring being provided with a projection 21.

22 denotes a rectangular frame in which there is mounted a plano-concave lens 23. The frame 22 is slidably mounted upon the arms 19. A convenient manner of so mounting the frame is shown in Figs. 5 and 6. The sides of the frame are provided with channeled extensions 24 adapted to receive the arms 19. Each extension may be provided with a centrally arranged concave projection 25 which may be grasped by the operator, the outer surface of the extension being cut away below and above such projection. Between each side of the frame 22 and the adjacent arm 19 there is interposed a spring 26 having a projection 27 yieldingly engaging said arm and adapted, when the frame 22 is in its lowermost position, to enter an aperture 28 in said arm to retain the frame in its lowered position. Each arm 19 is also provided with a similar aperture 28$^a$, which is arranged to engage the projection 27 when the frame 22 is elevated, as shown in Figs. 2 and 6. The lens 23 will be provided with lines 23$^a$ intersecting at the center thereof. A stop 29 projecting from each arm 19 engages the corresponding extension 24 and prevents the withdrawal of the finder from the arms 19 when the spring projections engage the apertures 28$^a$.

The ring 20 is conveniently applied to the lens carrier in the manner shown in Figs. 1 and 2 and is rotatable thereon.

The stop 30 is carried by a part which is movable with the lens, as the lens carrier, and is adapted to be engaged by the projection 21 when the ring 20 has been rotated to bring the frame to the vertical position shown in Figs. 1 and 2, the parts being so proportioned and arranged that, when the projection 21 is engaged with the stop 30 and the finder frame has been elevated to bring the spring projections 27 into the apertures 28$^a$, a line drawn through the sight opening 11 and the point of intersection of the cross lines 23$^a$ will be substantially parallel with the optical axis of the camera.

31 denotes a second stop carried by the lens carrier and adapted to be engaged by the projection 21 when the frame has been given a quarter revolution from the position shown in Figs. 1 and 2, to hold the finder in position for folding, with the lens, into the box.

In operation, suppose the parts to be in position shown in Figs. 1 and 2 and that the operator desires to fold up the camera. He grasps the projections 25, lowers the frame and finder to the position shown in Fig. 5 and rotates the finder around the lens carrier, until the projection 21 engages the stop 31. With cameras of ordinary construction, this will enable the lens, bellows and front to be folded into the casing or box 1 and at the same time employ a large finder. With standard makes of camera that are on the market, I am enabled, by this construction, to employ a finder lens which is substantially half the length and half the width of the sensitized film or plate employed with standard camera; and, in some makes of cameras, even longer finders may be employed. The concavity of the lens will be such that the field observed therethrough will be co-extensive with the field projected by the lens upon the sensitized film or plate.

Reference has been made to the adjustability of the block 10. The purpose of this is to enable the observer to observe, through the finder and the sight opening 11, the same field that is projected upon the film or plate by the lens. In photographing objects that are relatively near, the block 10 will be raised so that a line drawn through the sight opening 11 and the intersection of the lines 23$^a$ will be somewhat convergent toward the optical axis. As the distance of the objects photographed from the camera increases, the block 11 will be adjusted to bring the former line more nearly parallel to the optical axis. For distant objects, the aforesaid line and the optical axis will be parallel. The scale 13 will be graduated according to the distances of the objects to be photographed.

In opening the camera, it will be only necessary to drop the front 4, pull out the camera front and lens in the usual manner, grasp the projections 25 and rotate the finder to bring the same to the position shown in Figs. 1 and 2, at the same time elevating the finder frame until the stops 29 are engaged by extensions 24. The sight can then be used by folding the members 9 upwardly and the block 10 can be adjusted in accordance with the distance of the object from the camera.

It is frequently desirable to use a camera for tele-photo purposes. Under these conditions, the field covered by the lens is considerably narrowed. To accommodate the finder for use with a camera when employed for such purposes, an opaque frame 32, preferably of metal and resembling in outline a "mask" employed with negatives, may be used. This frame is provided with a central opening 33 which is of such size, when applied to the finder, as to represent in the latter the field projected by the lens upon the sensitized film or plate. For the reception of the frame or mask 32, the upper member of frame 22 may be provided with a slot 22$^a$ through which the frame or mask 32 may be inserted. The mask being of the same external dimensions as the lens 23, the only portion of the finder lens which is used is the central portion, and this portion will present to the observer the same field as will be projected by the lens upon the film or plate. To prevent the frame or mask 32 from dropping out of the frame 22, a spring-pressed pin 34 may be applied to the latter to engage an aperture 35 in an extension 36 of frame 32.

Having thus described my invention, what I claim is,—

1. In a camera, the combination of a box, a bellows, a lens, a frame movable with said lens, said frame having a pair of arms, a finder mounted between said arms and slidable longitudinally thereof, a stop arranged to limit the movement of the finder with respect to said arms, springs interposed between said frame and said arms, and a sight member carried by the box and coöperating with said finder.

2. In a camera, the combination of a box, a bellows, a lens, a finder movable with said lens, a sight member on said box coöperating with said finder, said sight member comprising a pair of arms, and a sight block adjustably supported by said arms, one of said arms having a scale for determining the adjustment of said block.

3. The combination, with a camera box, bellows and lens, of a frame rotatable with respect to said lens, said frame having a pair of arms, a finder lens having a frame adapted to be applied to said arms and to slide thereon, the latter frame being provided with projections on the arm-receiving portions thereof, and stops for limiting the movement of the finder frame with respect to said arms.

4. The combination, with a camera box, bellows and lens, of a frame movable with said lens, said frame having a pair of arms, and a finder lens having a frame adapted to be applied to said arms and to slide thereon, the latter frame being provided with springs adapted to engage said arms.

5. The combination, with a camera box, bellows and lens, of a frame movable with said lens, said frame having a pair of side arms each having spaced apertures, and a finder adapted to be applied to said arms and to slide thereupon, the finder being provided with a spring on each side thereof adapted to engage the arms and to enter the apertures thereof.

6. The combination, with a camera finder comprising a transparent body and a frame inclosing the same, said frame being provided with a slot in one of the sides thereof, of a member of substantially the same external dimensions as said transparent body and having an open center and adapted to be inserted into the frame through said slot, and means carried by the frame and co-acting with said member for retaining the same in place within the frame.

7. In a camera, the combination of a box, a bellows, a lens, a finder frame rotatable with respect to said lens and movable therewith, a lens adjustably mounted in said frame, and a sight member carried by the box, and coöperating with said lens.

8. In a camera, the combination of a box, a bellows, a lens, a frame movable with said lens and rotatable in a plane at right angles with respect to the optical axis of the camera and about a center substantially coincident with said axis, a finder lens adjustably mounted in said frame, stops arranged to limit the rotation of said frame to a quarter revolution, and a sight member carried by the box and coöperating with said finder.

9. In a camera, the combination of a box, a bellows, a lens, a frame movable with said lens, a finder adjustably mounted in said frame, and a sight member carried by said box and coöperating with the finder lens, said sight member being adjustable toward and from said box.

10. In a camera, the combination of a box, a bellows, and a lens, a frame for said lens, a finder frame rotatably mounted on the said lens frame, and a lens supported by the finder frame and adjustable with respect thereto toward and from the camera lens.

11. In a camera, the combination of a box, a bellows, a lens, a frame for said lens, a finder frame rotatably mounted on the former frame, a lens supported by the finder frame and adjustable with respect thereto toward and from the former lens, and stops arranged to limit the rotation of the finder frame with respect to the lens frame.

12. In a camera, the combination of a box, a bellows, a lens, a finder frame movable with said lens and rotatable in a plane at right angles to the optical axis of the camera and about a center substantially coincident with said axis, and a finder lens supported by said frame and adjustable with respect to said frame toward and from the optical axis of the camera.

13. In a camera, the combination of a box having a front opening, one of the sides of which is greater in length than another, a lens, a finder frame movable with said lens and rotatable in a plane at right angles with respect to the optical axis of the camera and about a center substantially coincident with the center of the camera lens, a lens supported by said frame and adjustable with respect thereto toward and from the optical axis of the camera and stops arranged to limit the rotation of said frame to support the frame in operative relation to a long and a short side of the front opening.

In testimony whereof, I hereunto affix my signature in the presence of two witnesses.

GEORGE F. HAMMOND.

Witnesses:
J. B. HULL,
BRENNAN B. WEST.